United States Patent [19]

Dahlgren et al.

[11] Patent Number: 5,083,434
[45] Date of Patent: Jan. 28, 1992

[54] TURBOCHARGED INTERNAL COMBUSTION ENGINE BOOST PRESSURE CONTROL SYSTEM

[75] Inventors: Mats Dahlgren, Lidingö ; Nils Jönsson, Stocksund, both of Sweden

[73] Assignee: Nira Automotive AB, Enebyberg, Sweden

[21] Appl. No.: 438,440

[22] PCT Filed: May 26, 1988

[86] PCT No.: PCT/SE88/00283
§ 371 Date: Jan. 17, 1990
§ 102(e) Date: Jan. 17, 1990

[87] PCT Pub. No.: WO88/09432
PCT Pub. Date: Dec. 1, 1988

[30] Foreign Application Priority Data

May 26, 1987 [SE] Sweden .............................. 8702208

[51] Int. Cl.⁵ .............................................. F02B 37/12
[52] U.S. Cl. ..................................................... 60/602
[58] Field of Search .................. 60/600, 601, 602, 603

[56] References Cited

U.S. PATENT DOCUMENTS 4,428,199 1/1984 Moore et al. .
4,452,044 6/1984 Iwamoto et al. .
4,702,080 10/1987 Ueno et al. ............... 60/602

FOREIGN PATENT DOCUMENTS 3336028 4/1985 Fed. Rep. of Germany .
3311626 9/1986 Fed. Rep. of Germany .
420294 9/1981 Sweden .
420295 9/1981 Sweden .

*Primary Examiner*—Michael Koczo
*Attorney, Agent, or Firm*—Young & Thompson

[57] ABSTRACT

A system for controlling the boost pressure in a turbocharged internal combustion engine comprising a control device (171), an operating device (11, 12, 13) controlled by the control device and operative in controlling the speed of a turbine (4) and means (22) for feeding to the control device (171) signals which represent the true boost pressure prevailing at a location upstream of the engine throttle valve (9). The control device includes a data processor (18, 21) in which there is stored data which relates to theoretic control-valve settings and values which are intended to give boost pressure control values as a function of engine speed. The control device is constructed to compare the true boost pressure with the given control value subsequent to an increase in load with a subsequent rise in pressure over an interval of time. The data processor (18, 21) is programmed, in accordance with the character of a change in the difference between the true value and the control value, to calculate this data control-setting correction data for regulating the control valve (13), and to write this data into a first memory (20, 21).

10 Claims, 6 Drawing Sheets

TURBOCHARGED INTERNAL COMBUSTION ENGINE BOOST PRESSURE CONTROL SYSTEM

The present invention relates to a control system and more specifically, although not exclusively, to a system for controlling the boost pressure of a turbo-charged internal combustion engine.

In the case of turbo-charged Otto-cycle engines, it is necessary to control the boost pressure in a manner which will ensure that the maximum permitted pressure is not exceeded. This maximum permitted pressure is determined by the dimensions of the cylinder head, crank shafts, connecting rods, etc. The maximum permitted transmission torque may also be a limiting factor in this regard.

The simplest method is to dimension the turbocharger in a manner which makes it impossible for the pressure to exceed a maximum permitted value. The maximum permitted supercharge, and therewith the highest torque, is obtained solely within the highest engine speed range with the throttle open to a maximum. This results in poor engine performance.

A more usual method is to feed back the boost pressure with the aid of a pressure-sensing device which activates a shunt valve, also referred to as a Waste Gate. The function of the shunt valve is to open a passageway which shunts part of the exhaust flow past the turbine, resulting in a reduced supercharge. The advantage with this system in comparison with a system which lacks feedback is that maximum torque can be moved down to more suitable engine speeds, e.g. speeds in the range of 3000-4000 rpm. The torque curve, however, still has a pronounced peak within a narrow range of engine speed range.

The function of the pressure-sensor shunt valve control system can be greatly improved with the aid of an electronic control system. In brief, the electronic system regulates the feedback pressure to the valve actuator, which in turn controls the shunt valve or Waste Gate. The feedback pressure is controlled by an on-off valve which taps-off a variable flow in pulsatile fashion, subsequent to constricting the flow in the feedback circuit from inlet to actuator. There is consequently applied to the actuator a pressure which corresponds to the pressure in the inlet minus the pressure drop across the constriction. By giving the actuator a lower nominal setting, i.e. a pressure setting at which the actuator will begin to open the Waste Gate, and by regulating the flow tapped off, it is possible to control the boost pressure in a manner to obtain a straight torque curve within a greater area than can be possibly achieved with solely mechanical feedback.

This basic technique is used today by several vehicle or car manufacturers and is consequently well known. The problem with present systems is that even though the control system is well tuned during manufacture of the engine, the engine data changes with time as a result of wear, such as to impair the performance of the control system with the passage of time. Rectification requires a certain amount of labor and retuning of the system takes time, all of which is cost intensive.

An object of the invention is to provide a self-teaching control system which is continuously self-adjusting to achieve optimum control.

Another object of the invention is to provide a control system which will produce a straight torque curve within the highest possible range of engine speed. Engine speed is limited by two factors:

a) There is insufficient exhaust-gas flow to drive the turbo in the lower engine-speed range (RPM-range).

b) In the higher engine-speed range, the maximum boost pressure is restricted by the highest dynamic that can be achieved in the flow through the control valve. In turn, this flow is contingent on the construction of the valve and the control unit.

It is desirable to achieve maximum torque at the lowest possible engine speed with the turbocharger provided. Attention must be paid, however, to driveability, as will be made more apparent hereinafter. Furthermore, the torque curve should be straight throughout all speeds up to high engine speeds.

When the engine or vehicle is accelerated, the response of a turbo-charged engine will be poorer than that of a suction engine of corresponding power. Among other things, this is due to the fact that:

a) It takes time for the turbo to accelerate.

b) In the case of a mechanical control system, the Waste Gate already begins to open at a lower pressure than the maximum pressure or available pressure.

Factor a) depends solely on the choice of turbo unit. On the other hand, it is a further object of the invention to minimize the effect of b), by lowering the feedback pressure to the actuator, thereby preventing premature opening of the actuator. The Waste Gate shall not open until the pressure has reached the permitted maximum. One requirement of the control system is that it shall produce the quickest possible response without overshoot.

Still another object of the invention is to improve driveability by minimizing the so-called "rubber band effect". This effect is characteristic of turbo engines and is due to the positive feedback between exhaust flow and inlet flow. An increase in the throttle valve angle results in an increase in exhaust flow, whereupon the turbine rotates faster and the inlet pressure increases, resulting in an increase in exhaust flow, etc. Consequently, it is difficult to control the effect by using the accelerator or gas pedal. The driver must constantly correct with the aid of the pedal in order to hold a steady speed. According to the invention the "rubber band effect" shall be minimized without detracting from how powerful the engine feels.

The aforesaid objects are achieved with a control system of the kind set forth in the introduction and having the characteristic features set forth in claim 1. Further characteristics and developments of the control system are disclosed in the depending claims.

The invention will now be described in more detail with reference to the accompanying drawings, in which FIG. 1 is a schematic illustration of a turbo-charged engine provided with an inventive control device;

Figure 1:
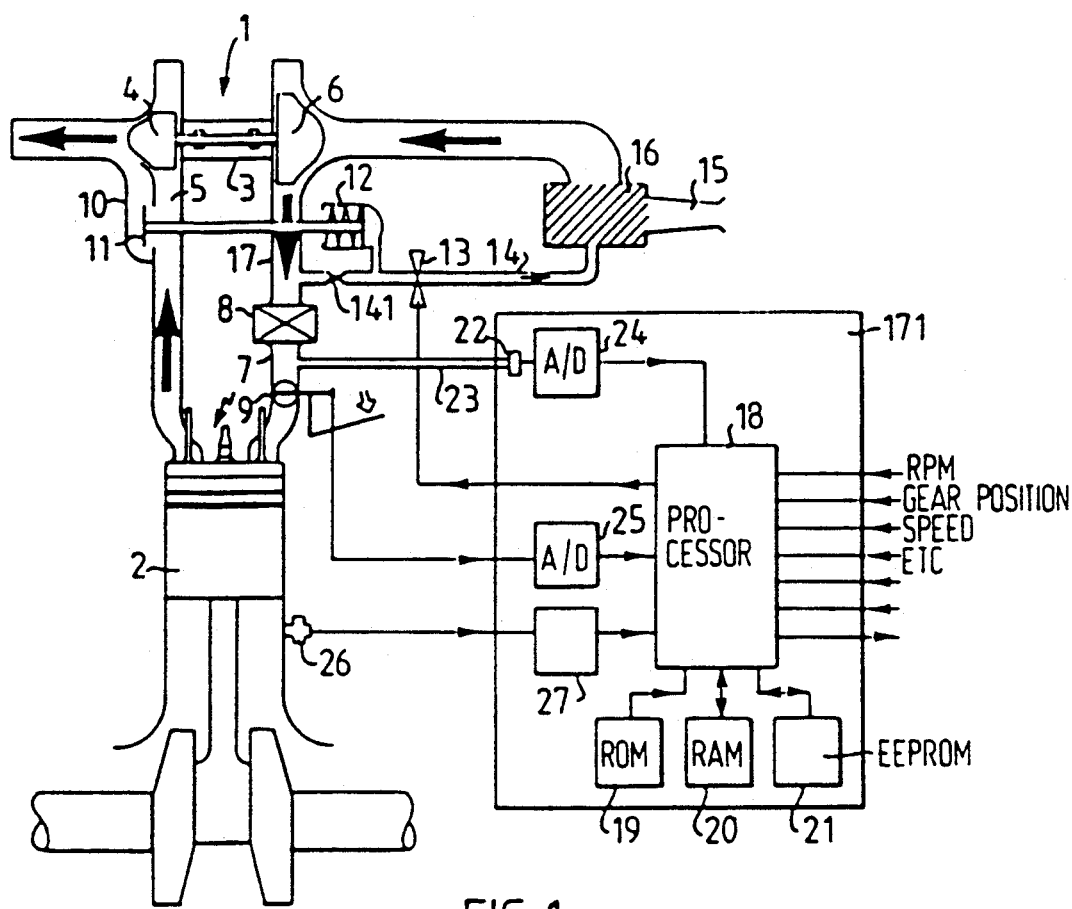

FIG. 1 illustrates a so-called turbo engine 1 of a known and relatively common kind. Consequently, only those parts of the engine which are associated with the present invention will be described in detail here. The engine 1 includes a four-cylinder Otto-cycle engine 2 with a turbo-compressor unit 3. The unit 3 has a compressor section 6 which communicates with the engine section pipe 7, through a boost air cooler 8. The engine throttle-valve 9 is placed in the suction pipe 7 and is controlled with the accelerator pedal, when the engine is fitted into a car. The gas flow through the turbine 4 is controlled by a shunt valve 11, a so-called Waste-Gate, which is located in a shunt line 10. The valve-plate of the valve 11 is operated by a pneumatic pressure-sensing actuator 12. When the valve is closed, the entire gas flow passes through the turbine 4. The pressure in the actuator 12, and therewith the setting of the shunt valve, is determined by an adjustable control valve 13, suitably an electromagnetic type valve, located in an outlet pipe, which extends from a compressor section 6 incorporating an inlet pipe 17 and located upstream of the boost-air cooler 8. The inlet pipe 17 is also connected to an inlet 15 via an air filter 16. A constriction 141 is located between the point of attachment of the pipe 14 to the device 12 and the pipe 17. The outlet end of the pipe 14 discharges into the air filter 16.

In accordance with the invention a system control device 171 is provided with a data processor 18 which in addition to a static store or memory (ROM) 19 incorporating the processor control program and a working memory (RAM) 20 co-acts with an electronic erasable, programmable memory (EEPROM) 21. The control device 171 is adaptive and operates with recursive identification, so as to correct a control parameter continuously in a manner described in more detail hereinafter. Present day controls of this kind are normally comprised of a complicated single multi-function component. All of the units shown in the block schematic of the device 171 may, for instance, be incorporated in a single-chip processor of the kind designated Motorola MC 6805 R3, i.e. with the exception of the illustrated pressure sensor 22 and the EEPROM-memory 21. It should be observed that the control device 171 also includes further electronic devices, such as amplifiers, converters and the like, although these devices have not been shown since they do not assist in explaining the inventive concept.

The boost pressure is sensed by a sensor 22, which is preferably incorporated in the device 171 itself and which is operative in sensing pressure through the intermediary of a hose 23. The sensor 22 is preferably an absolute-pressure sensor, so as to avoid influences occurrent when driving under different ambient atmospheric pressures. The output signal of the sensor 22 is passed to an input of the processor 18, via an analog/digital converter 24. The value of the throttle-valve angle L is transmitted to the processor, via an analog/digital converter 25. The signal derived from a knocking sensor 26 is transmitted to the processor 18 via a knocking analyzer 27 with digital output signal. In addition, the processor 18 is also fed with digital signals representing engine speed (RPM) and optionally also boost-air temperature, gear position, engine temperature, etc. It should be noted in this regard that when the signals representing these values have an analog form they are converted to digital form in an analog-digital converter.

The processor controls, inter alia, the control valve 13, which is controlled in a pulsatile fashion with controllable pulse intervals for open and closed valve positions, respectively. Longer valve-open times, i.e. longer relative pulse lengths, result in closure of the shunt valve 11 by the pressure-sensing activator 12, which decreases the flow through the shunt line 10 and increases the speed of the turbine, which leads to a higher boost pressure. Shorter valve-open times will thus result in lower boost pressures.

In the case of positive-transient pressure sequencies, which require quick control, the control valve 13 shall be fully open during a first time interval, whereafter the control device 171 shall send a relative pulse length (duty cycle) to the control valve 13, which results in a pressure value which is intended to be as close as possible to the correct value. If the relative pulse length is too short, it will take time for the control system to step-up the pressure to the correct value. The time delay is contingent on the time taken to accelerate the turbine and the setting times of the pressure-sensing activator. If the relative pulse length is too long it is possible that overshoot will occur, for the same reasons.

Correct setting values vary, inter alia, with the activator setting, wear, etc. To obviate the risk of overshoot it is necessary, in the majority of systems, to layout a relative pulse length which lies beneath the correct value. This solution, however, results in poor response.

In order to avoid these problems, the present invention utilizes adaptive control with recursive identification. The control device 171 has initially a theoretically calculated response pattern and/or a response pattern which experience has shown to be acceptable. Either the entire pattern, i.e. both algorithms and non-changeable and changeable forms, is stored in the EEPROM memory 21 or, alternatively algorithms with constant terms that are not changed are stored in the ROM 19, i.e. in the software, and the changeable correction terms are stored in the EEPROM 21. One advantage afforded by the first alternative is that the algorithms can be changed readily by the manufacturers in a late stage of manufacture. Different parameters that are dependent on car or vehicle variants can also be stored in the EEPROM 21.

The processor 18 is programmed so that subsequent to the initial rapid acceleration, it will investigate the control step-response with the object of determining whether or not a pressure overshoot has occurred, whether or not the pressure has increased too slowly (too long rise times) and whether or not a static error is present after a given period of time has lapsed. This information instructs the control device that constants in the algorithm shall be changed, the nature of the change and in which direction or sense the change is to be made. The correction values relating to these constants are stored in the EEPROM 21. These corrected constants are used in the control system when the car is next accelerated. The control device investigates the control response and stores fresh correction values in the EEPROM 21.

The system thus stores the setting values previously used. The values are used to correct the setting values, which are arranged in tables either in the ROM 19 or in the EEPROM 21, to compensate for wear and variations in the setting of the actuator 12 occurring with time. This function also enables wear or faults on the Waste Gate to be detected and also on pressure-sensing actuator, as will be described in more detail hereinafter.

Since the correction values are stored in an EEPROM, the values will remain in the memory even when the engine current is switched off, such that the adaptivity of the system will remain intact from one driving situation to the next. The most important gain obtained with adaptivity in accordance with the invention is that the control system gives the engine very quick response with no overshoot.

Figure 2:
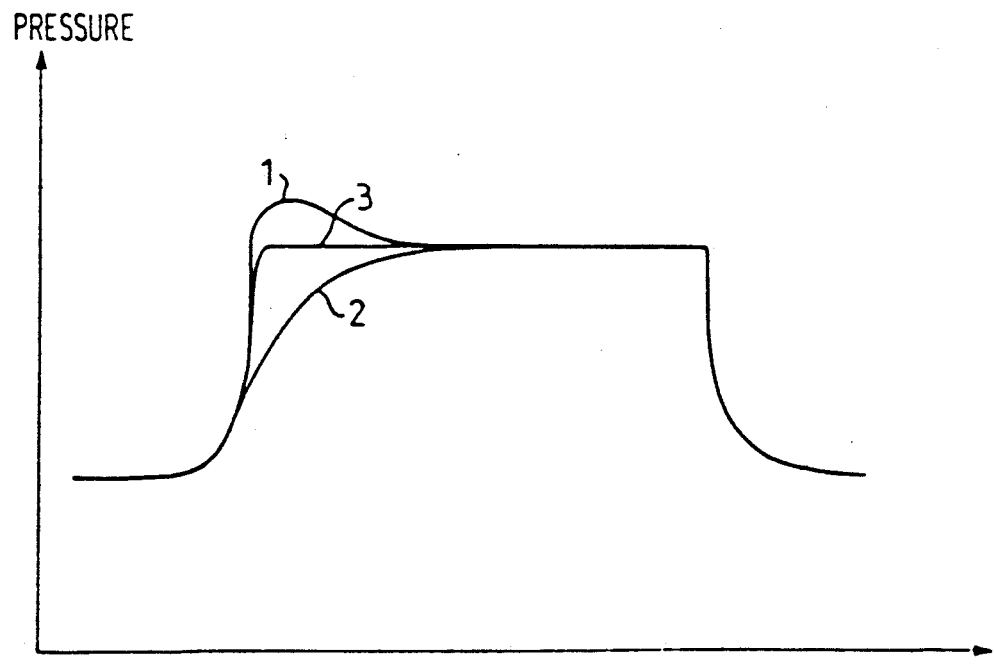
FIG. 2 is a diagram of various control sequences.

FIG. 2 illustrates a comparison between measurements which were made with the inventive control device and measurements which were made with other control systems which lacked the inventive adaptive control facility with recursive identification.

Curve 1 shows the step response of a control device with pressure feedback when the actuator setting is higher than the nominal value, but lies within the nominal value tolerances.

Curve 2 shows the step response of a control device when the actuator setting is lower than the nominal value, but still within the nominal value tolerances.

Curve 3 shows the step response of the inventive control device. The continuously effected adaptive setting cancels the effects of adjustment and manufacturing tolerances and adapts the control to engine wear occurring at a later date.

A suitable regulator for use with the control device is a so-called PID-regulator comprising a proportional part, an integrating part and a derivating part. The derivating part is stabilizing. It is therefore the derivating part which is corrected with regard to overshoot or an excessively long step response. The correction term is purely additive and is stepped-up each time that overshoot is established and is stepped-down each time a slow response is established. Adjustment of the correction term to its correct value can thus be effected a number of times, during which the driver rapidly accelerates the vehicle. As a result, the changes effected in the control system will not be abrupt, which is advantageous with regard to driving and to driving "feel". It should be noted that each change of a correction value is effected when the engine has adapted to a stable driving state and is driven stably for a pre-determined length of time. Consequently, no change will be made to the correction values when the vehicle is accelerated rapidly in quick successive bursts.

An advantage may be afforded by providing two regulator-parts of which the first is used for heavy acceleration and the other for moderate acceleration. Both parts may have additive correction terms obtained in the aforedescribed manner, but for different established speed changes.

The integrating regulator-part may also have a correction term. This term is preferably determined at the time when the correction terms are to be stored and thus when the engine has been running at an even speed for a given period of time after acceleration. That part of the regulated true-pressure value which is investigated in this regard is regulated deviation of said value from the control or set pressure. All of the correction terms are stored simultaneously.

Thus, correction of the derivating terms is effected by calculating the control-point, or set-point pressure and subtracting the measured true-pressure value at the beginning of the control, when the regulator is about to adjust to the control value. Correction of the integrating term is effected by calculating the control pressure and subtracting the true pressure subsequent to the lapse of a given period of time from the time at which the regulator was set to the control pressure. The derivation correction terms provide an indication of dynamic changes in the engine. Consequently, the value or values of the correction terms is, or are, monitored by the processor 18 in order to give a warning when these values exceed a pre-determined danger level which, if exceeded, may result, e.g., in initial impairment of the turbine bearings. The integration correction term provides an indication of residual engine faults, such as wear. Consequently, this term is monitored by the processor 18 so as to give a warning when this value exceeds a pre-determined danger level.

Figure 3:
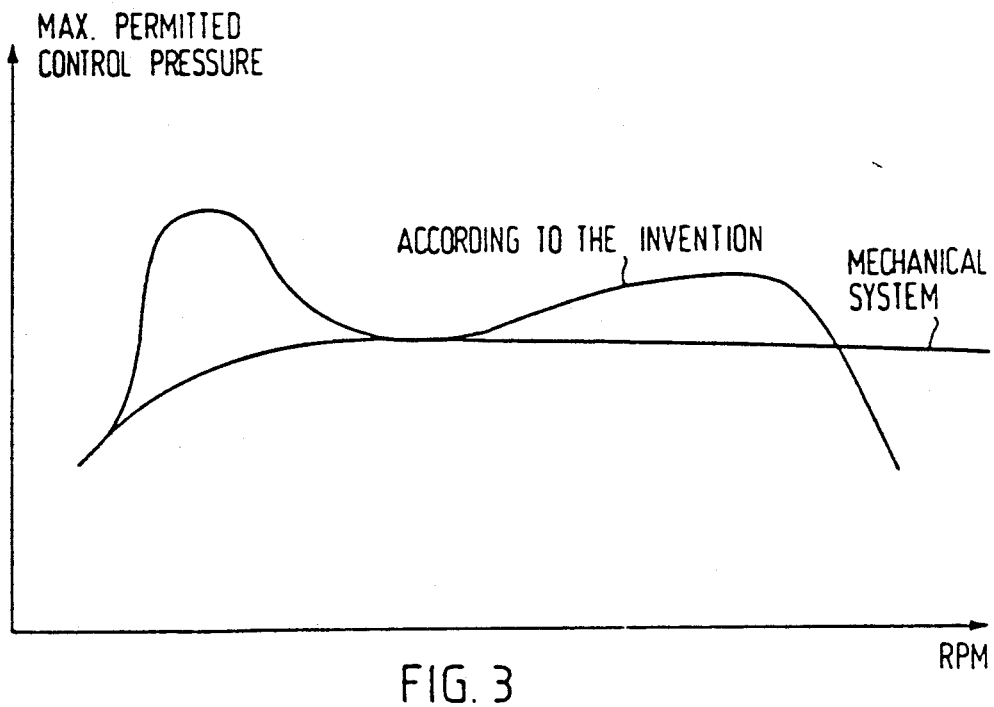
FIG. 3 is a diagram in which maximum boost is shown as a function of engine speed.

The processor 18 also calculates the control pressure on the basis of engine speed and prevailing throttle angle. In this regard there is first calculated the maximum permitted control pressure, which is based solely on engine speed. FIG. 3 shows this curve compared with a curve obtained with a purely mechanical system. In order to obtain a straight torque curve, the maximum permitted control pressure is namely limited by a curve which varies with engine speed. This curve has been obtained by making engine measurements empirically and may thus vary slightly between different makes of engine. The curve is stored in table form, either in the ROM 19 or in the EEPROM 21, at the time of manufacture.

Figure 4:
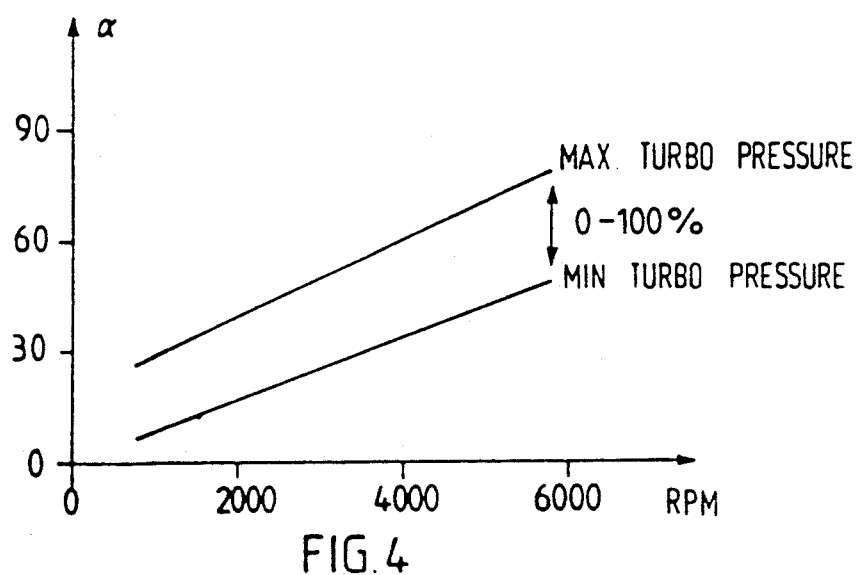
FIG. 4 is a diagram which presents throttle valve angle for maximum and minimum boost pressure as a function of engine speed.

FIG. 4 shows the throttle angle as a function of the engine speed for a maximum permitted control pressure and for the lowest control pressure at which an adjustment shall be made. The prevailing control pressure towards which the adjustment shall be made will preferably lie somewhere between these curves. When testing a Volvo engine the prepressure $P_{cont.}$ was found to be dependent on the prevailing throttle valve angle $a_{prev.}$, the prevailing maximum permitted control pressure $P_{cont.\ max.\ prev.}$, the throttle angle at the maximum permitted control pressure $a_{pb.\ max.\ prev.}$ and the throttle angle at a pressure of 100 kpa (roughly atmospheric pressure) $a_{100}$, in the following manner.

$$P_{cont.}=(P_{cont.max.prev.}-100) * (a_{prev.}-a_{100})/(a_{pb.max.prev.}-a_{100})+100$$

In these instances when the throttle is only opened slightly, beneath the line of minimum control pressure, the control pressure is restricted to a maximum of the nominal pressure setting in the Waste Gate activator 12,13. In those instances when the throttle is opened wide, above the line for minimum control pressure, the pressure increases linearly or non-linearly up to the maximum control pressure line related to engine speed.

The advantages afforded by a control pressure, or set-point pressure, which is dependent on throttle angle are:

Positive response feel, particularly at low engine speeds.

Reduced pressure upstream of the throttle valve at higher engine speeds results in a lower pressure drop across the valve, which in turn results in a reduced thermal load and lower fuel consumption.

Smoother power control at prevailing throttle angles when driving at constant speed or when making only small speed changes. Without this facility it is difficult to control the speed of the vehicle when driving at a constant speed.

A car is driven under a variety of differing conditions having mutually different dynamics. Accordingly, it may be advantageous to divide the conditions into different operating cases which require slightly different control algorithms and therewith different correction values. The processor 18 may therefore be programmed to determine which of the operation cases is the one concerned, e.g. by checking the prevailing boost pressure, engine speed and throttle angle and selecting therefrom the operation case concerned, e.g., from a programmed table. In this regard, each operation case or circumstance may have its own correction values stored in a system memory. The correction values used to warn of dynamic changes or excessive wear may therewith either be chosen within a particular operation case specific for this purpose or also all of the correction values may be monitored and those which first exceed the maximum permitted correction value produce a warning.

The factor which limits the maximum permitted torque is normally the transmission rather than the actual engine. The maximum permitted transmission in the case of the transmission will vary with the gear ratio. This factor is utilized in the control device 171, by letting the device control the torque in accordance with the prevailing gear ratio, this value being fed to the processor 18 in the form of a digital input signal, or by programming the processor 18 to calculate the gear position with the aid of an engine-speed signal and a vehicle-speed signal. The processor 18 is programmed to vary the torque in relation to the gear position, so that the benefit of the maximum torque for each gear position can be gained. Each gear has an individually adapted values table stored in the processor.

Since an EEPROM is not able to store an infinite amount of data etc., without the risk of an error occurring, it is preferred not to write the correction values into the EEPROM 21 each time the correction values are to be changed, but instead to use the working memory RAM 20 to work-store said values. Updated, current relevant correction values can then be written into the EEPROM 21 at even time intervals, e.g. at 10 minute intervals. This means that in practice the computer works with the corrections which are stored in the RAM 20, but collected from the EEPROM 21. It is also conceivable to update the correction values solely in RAM 20 during an unbroken driving sequence and to transfer the values solely when the engine speed has fallen close to zero, it being possible to use this facility as an indication that the vehicle is about to be parked and the engine current switched off.

The knocking sensor 26 is operative in detecting engine knock. Normally, the ignition system will decrease the ignition angle when knocking occurs. This results in unfavourable operating conditions with higher fuel consumption, increased emission values, higher exhaust gas temperatures and reduced torque. The control device 171 instead reduces the boost pressure stepwise until the engine ceases to knock. The ignition angle can then be sustained at the ignition angle prior to the angle at which knocking occurs, therewith avoiding the first three drawbacks of the aforesaid drawbacks. The reduction in torque, however, is unavoidable.

Figure 5:
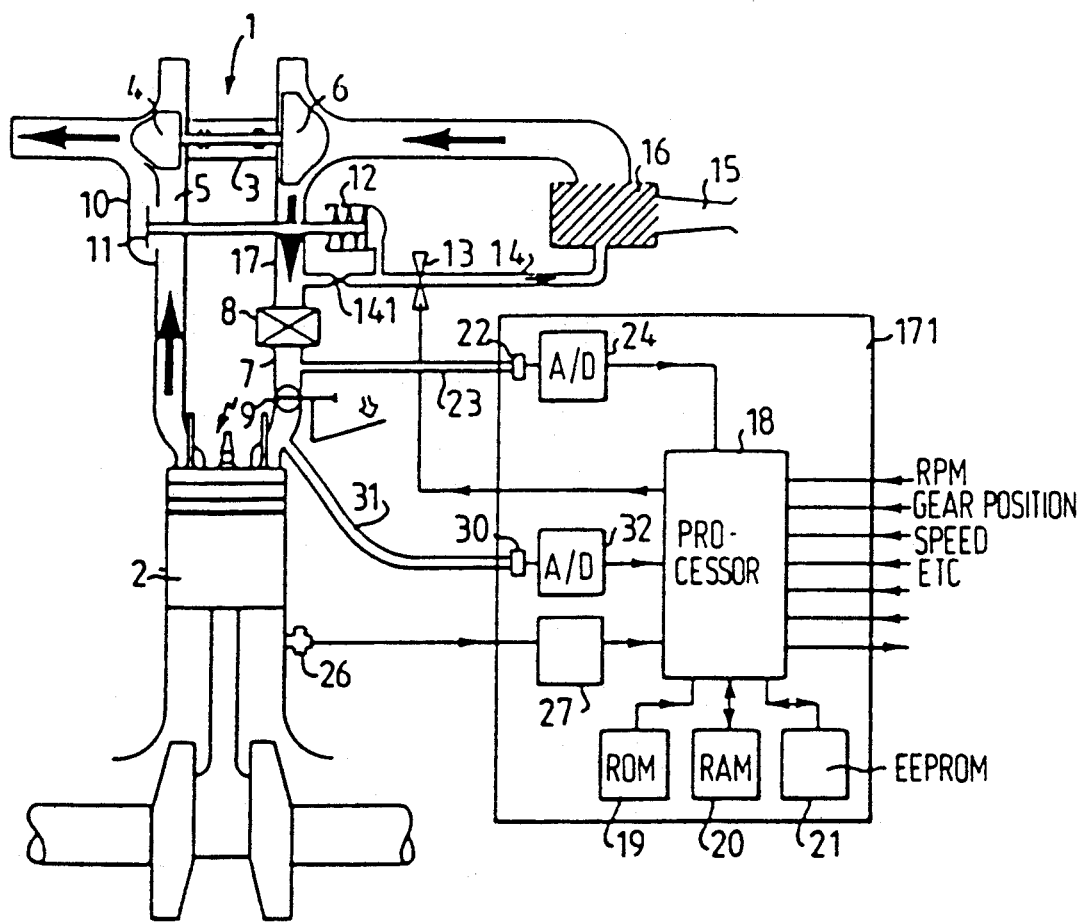
FIG. 5 illustrates an embodiment of an engine sensor arrangement different then that illustrated in FIG. 1.
Figure 6A:
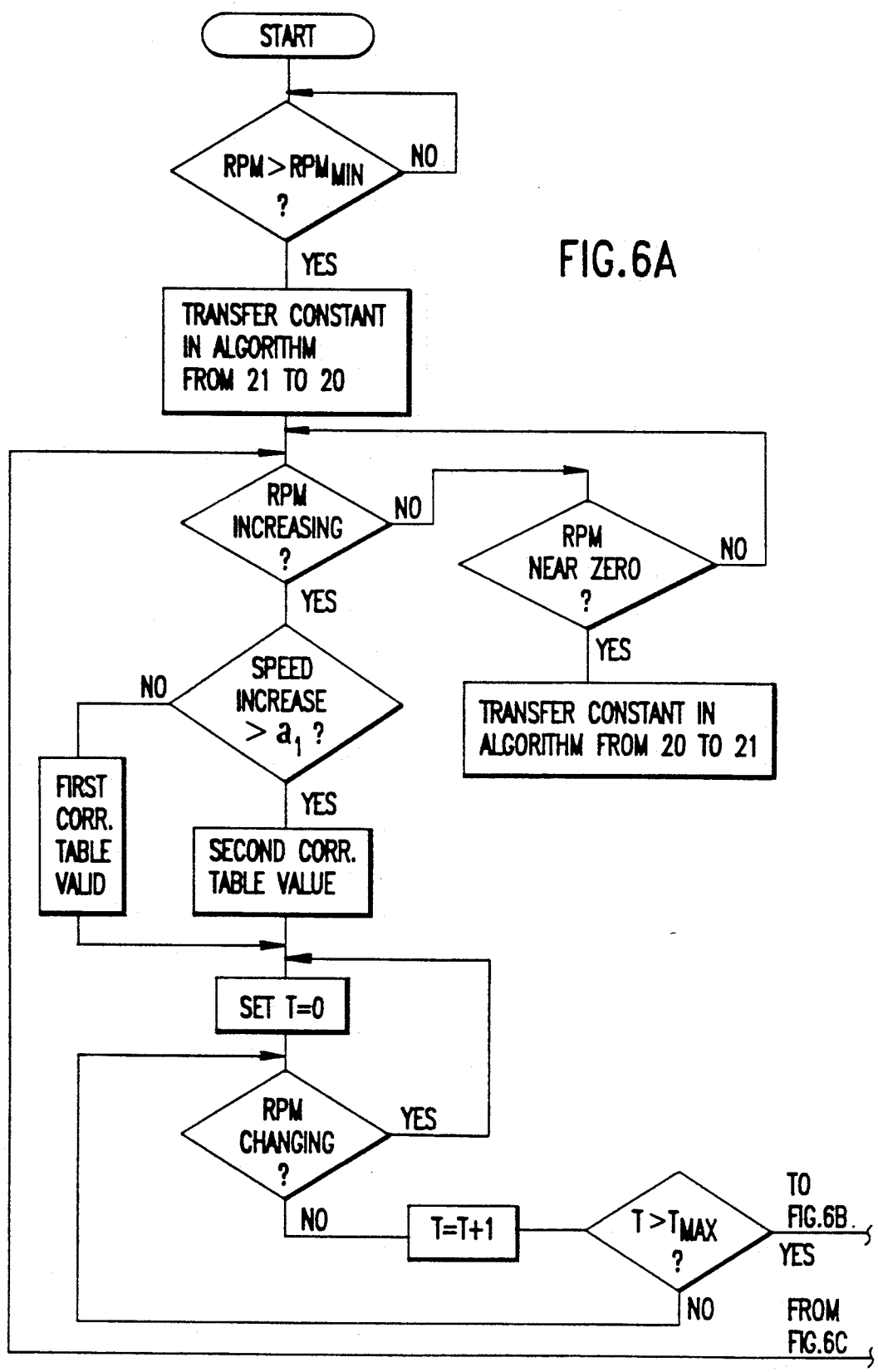
FIGS. 6A, 6B and 6C are a flow chart showing the operation of the control device according to an embodiment of the invention.
Figure 6B:
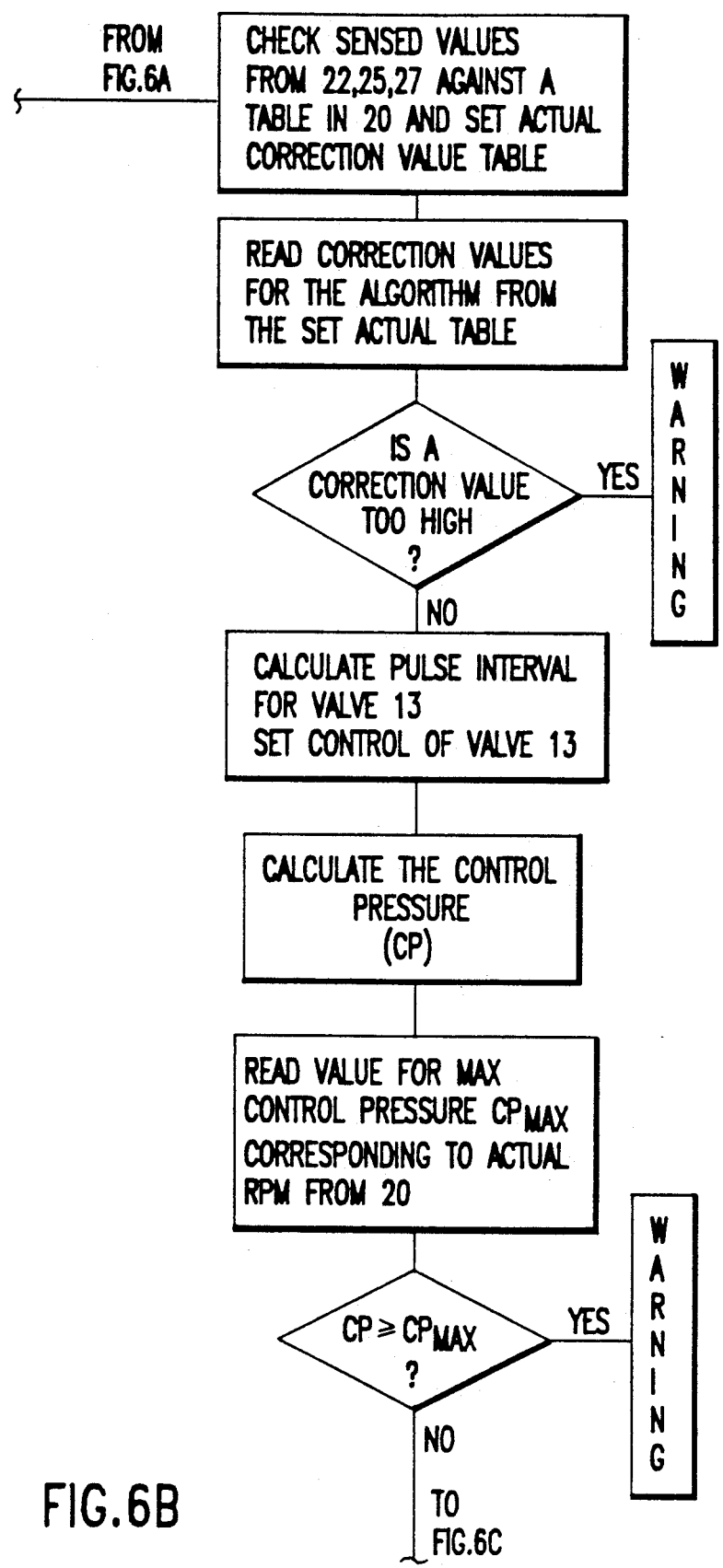
Figure 6C:
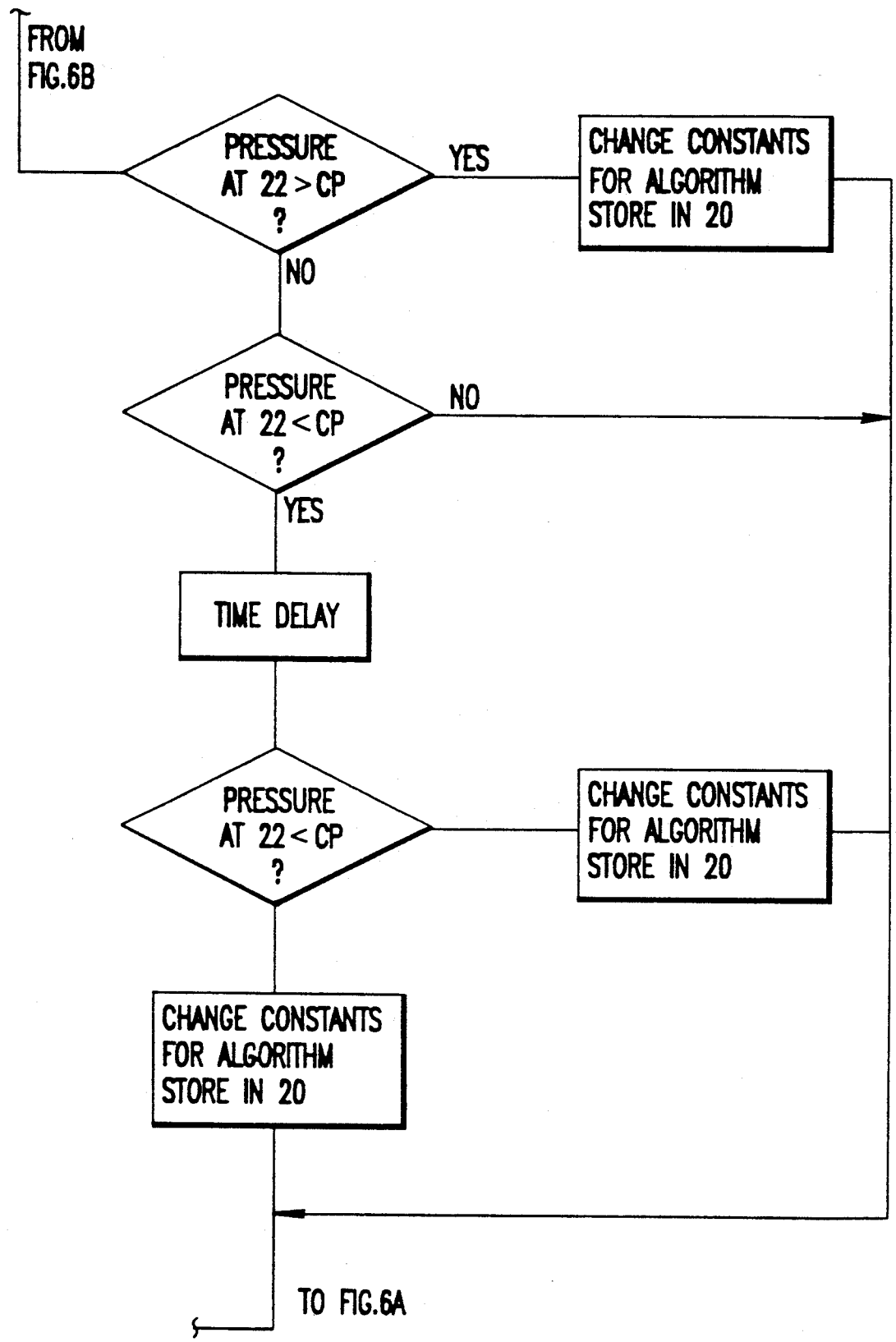

In the aforegoing it has been stated that the throttle angle is indicated. The important factor in this regard with respect to the function of the engine and the system is actually the pressure difference across the valve 9. This pressure differential is a function of the throttle angle $\alpha$. Consequently, instead of measuring the throttle angle an extra sensor 30 can be arranged to sense the pressure in the suction pipe 7 of a location downstream of the throttle valve 9, as illustrated in FIG. 5. The pressure sensor 30, similar to the pressure sensor 22, is preferably an absolute-pressure indicator and is located in the control device arrangement 171 in communication with the pipe 7, via a hose 31. Naturally, a relative-pressure sensor could also be used as the sensor 30. This will require, however, the provision of an extra hose, drawn from the hose 23 to the rear side of the sensor 30 facing the analog/digital converter 32. The signal of the sensor 30 is, via an analog/digital converter 32, fed to the processor 18, which builds a difference signal from the difference between the two signals from the sensors 22 and 30 and uses this difference signal as a basis for calculating the control or set-point boost-pressure. The curves in FIG. 4 then obtain a different shape. The control device makes no conversion from pressure difference to throttle angle, but instead calculates the boost-pressure control value by direct use of the pressure difference with the aid of a stored algorithm intended therefor.

As will be understood, the advantages recited above with regard to the throttle-angle dependent boost pressure, described with reference to FIG. 1, will also apply to boost pressure which is dependent on the pressure difference across the throttle valve 9.

The control device 171 will, of course, also control the engine at the limit of the engine and/or the vehicle working range. The calculated vehicle maximum speed, upon which dimensioning of certain vehicle components is based, e.g. brakes, is calculated from the peak output or top performance of the engine. Greater power would require the vehicle to be dimensioned for higher top speeds, which would increase costs. Because the central device 171 controls the torque, the engine power-output can be limited to a value which corresponds to the road effect at desired top speeds, i.e. road topography, road surface, etc.. When vehicle speeds approach the desired top speed, the device 171 will therefore lower the boost pressure in accordance with a curve programmed in the computer, so that the power at top speed will correspond to the road effect at this speed.

It is normal practice to provide vehicles, e.g. cars with an overdrive. Wear on electrically operated overdrives is greater with higher torques at the time of changing to overdrive. The control device 171 will limit the torque when changing to overdrive, by reducing the boost pressure. This reduction is also effected when changing down from overdrive to fourth (4th) gear. If the overdrive clutch slips, this reduction in boost pressure is maintained until slipping ceases. The boost pressure is then increased under time control.

We claim:

1. A system for controlling the boost pressure in a turbocharged internal combustion engine having an engine throttle valve, comprising: a control device (171); an operating device (11, 12, 13) connected to and controlled by said control device and so disposed as to control the speed of turbine (4) and a compressor (6) coupled thereto; and means (22) connected to the control device for feeding to the control device (171) signals which represent actual boost pressure at a location upstream of the engine throttle valve (9), said control device comprising a data processor (18-21) having stored therein data relating to predetermined operating device settings and values representative of boost-pressure control values as a function of engine speed; said control device having means for detecting engine load and being adapted to compare the actual boost-pressure with a given control value subsequent to an increase in engine load with a subsequent rise in pressure over an interval of time; and said data processor (18-21) being programmed to make a calculation in response to changes in a difference between the actual value and the control value and to write into a first memory control-setting correction data for regulating the operating device, said control device controlling said operating device in accordance with the correction data such that upon the occurrence of subsequent increase in engine load with subsequent rises in pressure, a lower pressure overshoot is obtained when adjusting to the control pressure if the change includes the occurrence of an overshoot, and a shorter adjustment time is obtained if the change includes the occurrence of an adjustment time exceeding a predetermined value.

2. A system according to claim 1, wherein said data processor comprises an electronic erasable programmable read-only memory (EEPROM).

3. A system according to claim 1, wherein the corrected data is written into a working random-access memory (RAM 20) in the data processor; and wherein at specific time intervals and a given engine speed, the correcting data stored in the working memory (RAM 20) at that moment in time is transferred to and stored in an electronic erasable programmable read-only memory (EEPROM 21).

4. A system according to claim 1, wherein subsequent to an occurrent increase in load, the data processor (18-21) investigates under which of a plurality of predetermined operating states the engine is working at that moment based on prevailing engine operating values; and in that mutually differing correction data are written into the first memory and used to control the boost pressure in said different operating states.

5. A system according to claim 1, wherein data concerning maximum permitted control boost-pressure in dependence on the engine speed and on the throttle valve setting is stored in the data processor; the data processor is fed with information dependent on the throttle valve setting; and the data processor is programmed to calculate the control value of the boost pressure with the aid of said throttle-valve information and with the aid of the data concerning the maximum permitted boost-pressure control value at the prevailing engine speed and throttle-valve setting information.

6. A system according to any of claims 1, wherein data concerning maximum permitted control boost-pressure in dependence on the engine speed and on the pressure difference across the throttle valve is stored in the data processor; a means (30) is provided for feeding to the control device (171) signals which represent the actual value of the pressure downstream of the engine throttle valve (9); and the data processor is programmed to calculate the boost-pressure control value with the aid of the difference between the signals from pressure sensing means (22,30) located on respective sides of the throttle valve (9) and with the aid of the data concerning the maximum permitted boost-pressure control value at the prevailing engine speed and pressure difference over the throttle valve.

7. A system according to claim 5, wherein data concerning the maximum permitted control boost-pressure in dependence on the engine speed varies such that boost-pressure control values calculated on the basis of this data produce a straight engine-torque curve within the major part of the engine speed range.

8. A system according to claim 5, wherein calculation of a control pressure $P_{cont}$ is effected in accordance with the formula $$P_{cont.} = (P_{cont.max.prev.} - 100)*(a_{prev.} - a_{100})/(a_{pb.max.prev.} - a_{100}) + 100$$

where $a_{prev.}$ is the prevailing throttle valve angle, $a_{100}$ is the speed throttle valve angle at the prevailing engine speed and approximately at atmospheric pressure, $P_{cont.max.prev.}$ is the intended maximum permitted boost-pressure control value at the prevailing engine speed, and $a_{pb.max.prev.}$ is the angular setting of the throttle valve obtained at the prevailing engine speed at $P_{cont.max.prev.}$.

9. A system according to claims 5 for an engine which is connected to a multi-ratio gear box, wherein various variations in the permitted maximum control pressure in dependence on the engine speed are stored in the data processor in accordance with different gear ratios.

10. A system according to claim 1 for an engine which is connected to a multi-ratio gear box, wherein various variations in the maximum permitted control pressure in dependent on the engine speed are stored in the data processor in accordance with different gear ratios.

* * * * *